United States Patent
DePue et al.

(10) Patent No.: US 6,934,037 B2
(45) Date of Patent: Aug. 23, 2005

(54) SYSTEM AND METHOD FOR OPTICAL NAVIGATION USING A PROJECTED FRINGE TECHNIQUE

(75) Inventors: Marshall T. DePue, San Mateo, CA (US); Dale W. Schroeder, Scotts Valley, CA (US); Tong Xie, San Jose, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/742,384

(22) Filed: Dec. 19, 2003

(65) Prior Publication Data

US 2005/0073693 A1 Apr. 7, 2005

Related U.S. Application Data

(63) Continuation-in-part of application No. 10/680,525, filed on Oct. 6, 2003.

(51) Int. Cl.$^7$ ................................................. G01B 9/02
(52) U.S. Cl. ..................................................... 356/498
(58) Field of Search ................................ 356/520, 450, 356/497, 498, 521, 28, 28.5, 496, 493, 486, 499; 250/208.1, 221

(56) References Cited

U.S. PATENT DOCUMENTS

| | | | | |
|---|---|---|---|---|
| 4,168,906 A | * | 9/1979 | Schwiesow | 356/28 |
| 4,470,696 A | * | 9/1984 | Ballard | 356/28.5 |
| 4,664,513 A | * | 5/1987 | Webb et al. | 356/28 |
| 4,794,384 A | * | 12/1988 | Jackson | 345/166 |
| 5,212,535 A | * | 5/1993 | Miyazaki et al. | 356/28 |
| 5,229,830 A | * | 7/1993 | Ishida et al. | 356/28.5 |
| 5,578,813 A | | 11/1996 | Allen et al. | |
| 5,587,785 A | * | 12/1996 | Kato et al. | 356/28.5 |
| 5,589,858 A | * | 12/1996 | Kadowaki et al. | 347/14 |
| 5,644,139 A | | 7/1997 | Allen et al. | |
| 5,786,804 A | | 7/1998 | Gordon | |
| 6,281,882 B1 | | 8/2001 | Gordon et al. | |
| 6,424,407 B1 | * | 7/2002 | Kinrot et al. | 356/28 |
| 6,433,780 B1 | | 8/2002 | Gordon et al. | |
| 6,442,725 B1 | | 8/2002 | Schipke et al. | |
| 6,690,474 B1 | * | 2/2004 | Shirley | 356/603 |

OTHER PUBLICATIONS

Xie, Tong, "Interferometer Based Navigation Device," U.S. Appl. No. 10/439,674, filed May 16, 2003.
"Method and Device for Optical Navigation," U.S. Appl. No. 10/630,169, filed Jul. 30, 2003.
"Method and Device for Optical Navigation," U.S. Appl. No. 10/680,525, filed Oct. 6, 2003.
Siegman, A.E, "Lasers," University Science Books, 1986, pp. 54–55.
Wyant, J.C., "White Light Extended Source Shearing Interferometer," Applied Optics, vol. 13, No. 1, Jan. 1974, pp. 200–202.
Malacara, D., "Optical Shop Testing," Wiley–Interscience, ISBN 0471522325, 2nd Ed., Jan. 1992, Chapters 1–7.
Barkas, W. W., "Analysis of Light Scattered from a Surface of Low Gloss into its Specular and Diffuse Components," Proc. PHys. Soc., vol. 51, (1939), pp. 274–295.
Snadden, Michael J., et al., "Injection–locking technique for heterodyne optical phase locking of a diode laser," Optics Letters, vol. 22, No. 12, (Jun. 15, 1997), pp. 892–894.
Baney, Douglas M., et al., "Low Power Consumption, Broad Navigability Optical Mouse," Agilent Technologies, Inc., U.S. Appl. No. 10/697,421, filed Oct. 30, 2003.

* cited by examiner

Primary Examiner—Samuel A. Turner

(57) ABSTRACT

A method for determining relative movement between an optical navigation device and a navigation terrain includes generating two overlapping coherent optical beams, and generating a pattern of interference fringes between the two overlapping optical beams. The method further includes illuminating a surface portion of the navigation terrain with the pattern of interference fringes, imaging a fringe-illuminated surface portion, and generating a pattern of signals in response to the imaged fringe-illuminated surface portion.

31 Claims, 3 Drawing Sheets

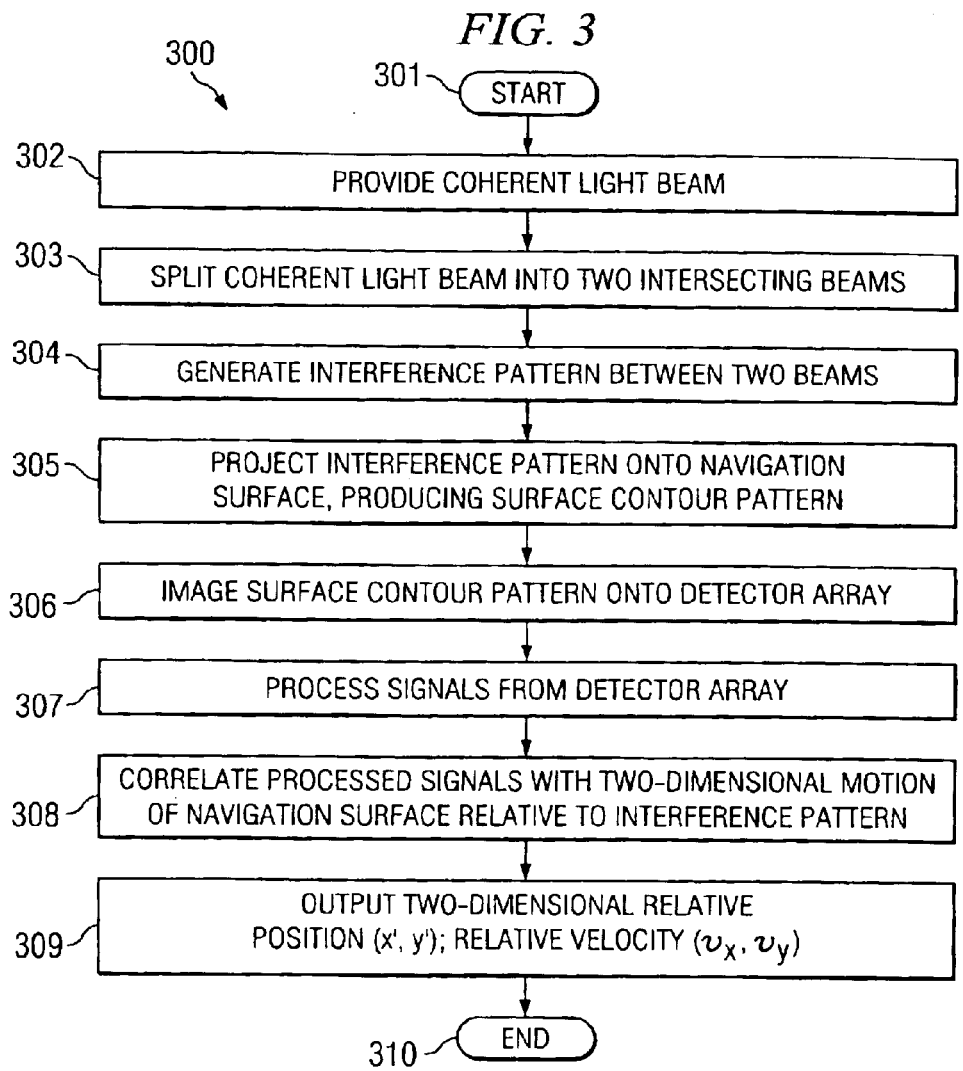
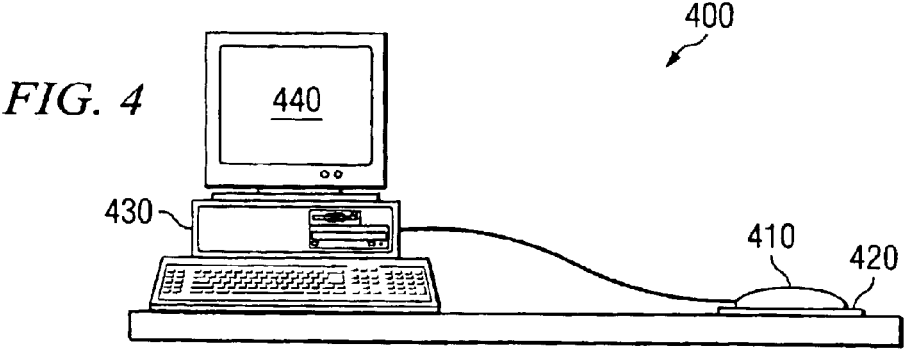

SYSTEM AND METHOD FOR OPTICAL NAVIGATION USING A PROJECTED FRINGE TECHNIQUE

CROSS-REFERENCE TO RELATED APPLICATIONS

This application is related to co-pending and commonly assigned U.S. patent application Ser. No. 10/439,674, filed May 16, 2003, titled "INTERFEROMETER BASED NAVIGATION DEVICE," co-pending and commonly assigned U.S. patent application Ser. No. 10/630,169, filed Jul. 30, 2003, titled "METHOD AND DEVICE FOR OPTICAL NAVIGATION," co-pending and commonly assigned U.S. Continuation-in-Part patent application Ser. No. 10/680,525, filed Oct. 6, 2003, titled "METHOD AND DEVICE FOR OPTICAL NAVIGATION," and co-pending and commonly assigned U.S. patent application Ser. No. 10/697,421, filed Oct. 30, 2003, titled "LOW POWER CONSUMPTION, BROAD NAVIGABILITY OPTICAL MOUSE," the disclosures of which are hereby incorporated herein by reference.

TECHNICAL FIELD

This disclosure relates to motion sensing optical devices and more particularly to systems and methods for optical navigation using a projected fringe technique.

BACKGROUND OF THE INVENTION

Existing optical devices for relative motion detection utilize pattern correlation techniques to determine relative motion between the device and a surface by capturing patterns characterizing the surface as the device passes over the surface (or equivalently as the surface moves past the device). Both the distance and the direction of the device movements are determined by comparing one pattern frame with the next. This technique typically detects intensity variations of shadows on surfaces; and its sensitivity and usability depends on the intensity contrast in the captured surface patterns. Relative motion sensors are used, for example, for computer pointer (e.g., mouse) control. Such pointers typically use optics to control the position of the pointer on the computer screen. More generally, optical navigation information can be used to compensate for distortion artifacts of curvilinear and rotational movement of the scanning device along a scan path.

U.S. Pat. Nos. 5,786,804; 5,578,813; 5,644,139; 6,442,725; 6,281,882; and 6,433,780 describe examples of optical mice, other hand-held navigation devices, and hand-held scanners. Typical existing devices do not function well on specular or gloss surfaces, uniform surfaces, or surfaces with shallow features, for example glass or white board. In such devices, in order to improve image contrast, specular reflections are usually blocked, and only the scattered optical radiation from the surface is captured. The surface used typically must be capable of casting shadows. Generally this means that the surface features to be observed must have dimensions in the geometric optics range for the wavelength of the optical radiation used. Accordingly, restriction to specific surface types is a typical shortcoming of current optical mouse designs.

BRIEF SUMMARY OF THE INVENTION

In accordance with the invention, an optical navigation system for determining movement relative to a navigation terrain is provided. The system includes an optical navigation device operable to generate two overlapping beams of coherent optical radiation. The two overlapping beams are operable to generate a pattern of interference fringes, such that the two overlapping beams with the fringe pattern are operable to illuminate a surface portion of the navigation terrain. The optical navigation device further includes a detector array operable to generate an output pattern of signals in response to an input optical image pattern, and an imaging element disposed to image onto the detector array a navigation terrain surface portion illuminated with the two overlapping beams.

In further accordance with the invention, a method for determining relative movement between an optical navigation device and a navigation terrain is provided. The method includes generating two overlapping coherent optical beams, and generating a pattern of interference fringes between the two overlapping optical beams. The method further includes illuminating a surface portion of the navigation terrain with the pattern of interference fringes, imaging a fringe-illuminated surface portion, and generating a pattern of signals in response to the imaged fringe-illuminated surface portion.

BRIEF DESCRIPTION OF THE DRAWINGS

For a more complete understanding of the present invention, reference is now made to the following descriptions taken in conjunction with the accompanying drawings, in which:

FIG. 3 is a flow diagram depicting an operational sequence for optically determining two-dimensional movement of a navigation surface relative to a navigation device, in accordance with embodiments of the invention; and FIG. 4 is a diagram depicting a computer system, in accordance with embodiments of the invention.

DETAILED DESCRIPTION OF THE INVENTION

Figure 1:
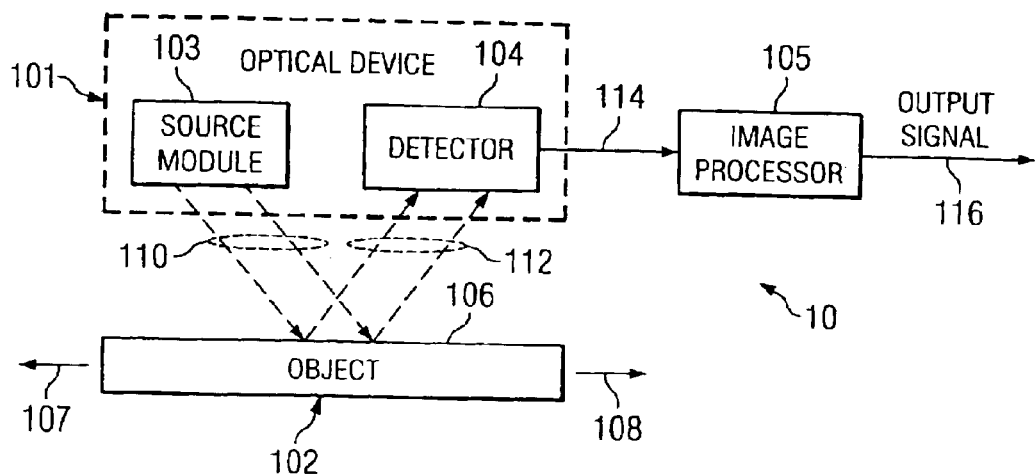
FIG. 1 is a high level block diagram depicting a system for optical navigation, in accordance with embodiments of the invention.

FIG. 1 is a high level block diagram depicting system 10 for optical navigation, in accordance with embodiments of the invention. Optical navigation system 10 determines relative position between optical device 101, for example an optical mouse, and navigation terrain 102, which may be in motion (as represented by arrows 107, 108) in any direction relative to optical device 101. Navigation terrain 102 as used hereinafter is an object moving or variably positioned relative to optical device 101, such that the relative movement or position between optical device 101 and navigation terrain 102 determines an output signal.

In operation, navigation terrain 102 is illuminated with optical radiation 110 from source module 103 of optical device 101. Optical radiation 110 is processed by interaction with navigation terrain 102, such that patterns in illuminating optical radiation 110 are modified in exit optical radiation 112 propagating from (e.g., transmitted through or reflected from) navigation terrain 102. In some embodiments of the invention, the pattern in exit optical radiation 112 is modified through interaction, for example, reflection or scattering, of illuminating optical radiation 110 with surface 106 of navigation terrain 102. Alternatively, for example, the pattern may be modified through interaction occurring during transmission of optical radiation 110 through the volume of navigation terrain 102.

A detector, for example detector array 104, captures patterned exit optical radiation 112 and generates signal 114. A fringe pattern exists in exit optical radiation 112 resulting from the interference of two incident wavefronts in illuminating optical radiation 110 and their mutual interaction with navigation terrain 102. These fringe patterns are bright and dark modulations in the spatial intensity profile of exit optical radiation 112 corresponding directly to surface height variations in surface 106 of navigation terrain 102. Capture may be performed using a detector array, for example, a CCD, CMOS, GaAs, amorphous silicon, or any other suitable detector array. Typically, the wavelength spectrum in optical radiation 110 emitted from source module 103 is matched to the wavelength response of detector array 104 to optimize signal efficiency. Signal 114 is then transmitted to processor 105, where signal 114 is further processed, and output signal 116 is generated in response to signal 114. For example, in processor 105, processing to determine relative movement can be performed traditionally using correlation algorithms that compare successive pairs of captured frames. In some embodiments of the invention, timing signals may be provided to determine relative velocity. Output signal 116 may be configured, for example, to drive the position of a pointer on a computer screen.

Source module 103 and detector array 104 are typically packaged together in optical device 101 for structural integrity. Optionally, processor 105 may also be packaged in an optical device, for example optical device 101, but alternatively may be located elsewhere in optical navigation system 10. In some embodiments of the invention, optical device 101 represents an optical mouse for a computer system, and is optionally hand-movable by an operator.

Figure 2A:
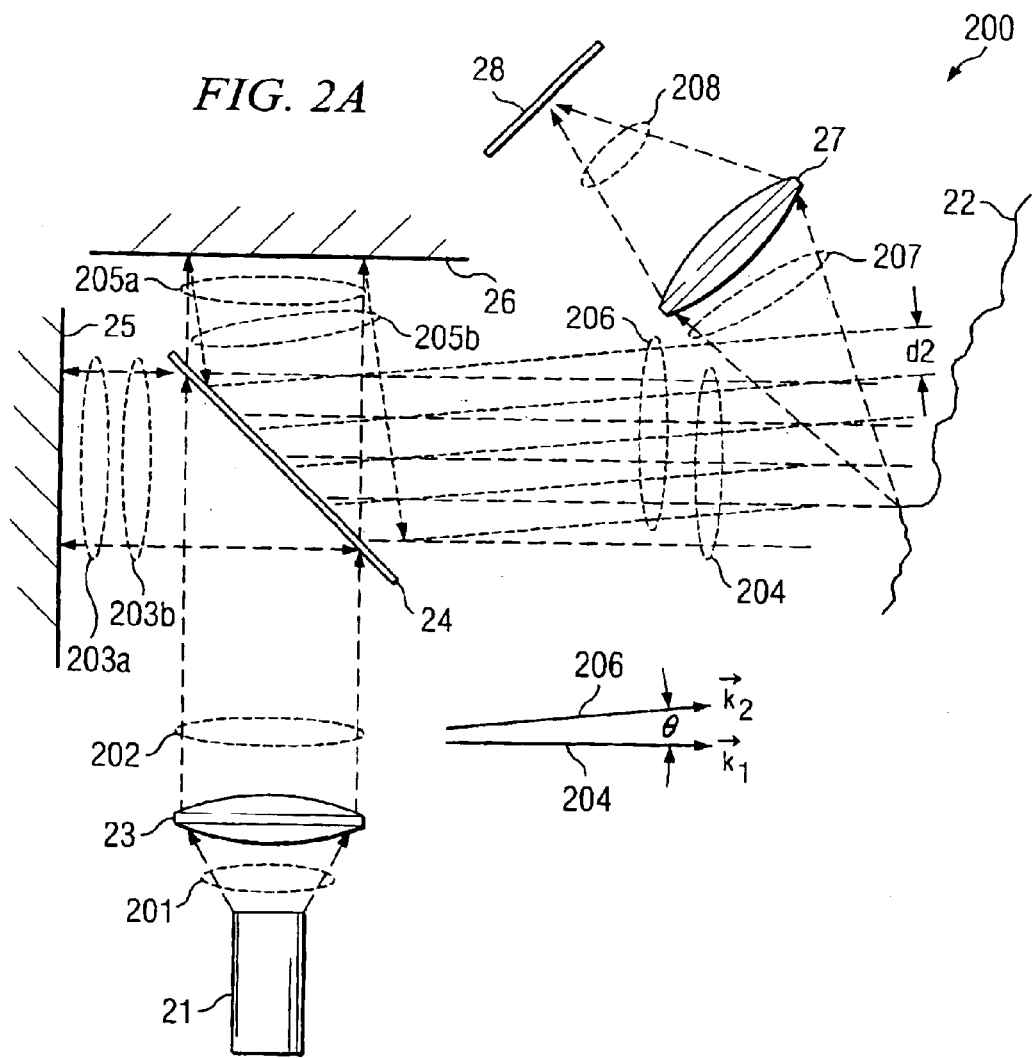
FIG. 2A is an optical diagram depicting a system implementation for optical navigation using a projected fringe technique, in accordance with embodiments of the invention.

FIG. 2A is an optical diagram depicting system implementation 200 for optical navigation using a projected fringe technique, in accordance with embodiments of the invention. System 200 incorporates a Michelson/Twyman-Green interferometer configuration, including splitter 24 and reflectors 25–26, which split and redirect light from coherent light source 21 into two overlapping coherent light beams (plane waves) 204, 206 that illuminate navigation surface 22. Light from coherent light source 21, for example a VCSEL laser source, is emitted as diverging light beam 201, which is then collimated to form parallel light beam 202, for example using collimating element 23. At splitter 24, parallel light beam 202 is partially reflected as reflected beam 203a and is partially transmitted as transmitted beam 205a. Reflected beam 203a is reflected from reflector 25 into reflected beam 203b, which is then partially transmitted through splitter 24 into illuminating beam 204. Similarly, transmitted beam 205a is reflected as reflected beam 205b, which is then partially reflected from splitter 24 into illuminating beam 206.

Reflector 26 is tilted at a small wedge angle relative to the normal to reflector 25, such that illuminating beams 204 and 206 overlap at an angle theta (θ) relative to one another, as shown in the accompanying detail of wave vectors $\vec{k}_1$ of illuminating beam 204 and $\vec{k}_2$ of illuminating beam 206. The two plane waves 204, 206, which can be taken as equal intensities without loss of generality, interfere and generate a projected pattern of alternating light and dark fringes on navigation surface 22, with fringe spacing $$d2 = (\text{wavelength}/2)/(\sin(\theta/2)), \quad (1)$$

where fringe spacing d2 is measured from the center of a dark fringe to the center of the next adjacent light fringe and where θ is the angle between wave vectors $\vec{k}_1$ and $\vec{k}_2$. This is the well-known technique of Moire metrology, whereby surface deformation, surface vibration, and surface contour may be measured. For simplicity, not shown are beams formed at splitter 24 by the partial reflection of reflected beam 203b and by the partial transmission of reflected beam 205b. The latter partially transmitted beam may reenter the cavity of laser source 21, potentially adversely affected laser mode performance, but this can be avoided by rotating the splitter slightly to prevent the beam from reentering. Alternatively, an isolator, for example a Faraday rotator, may be placed between the laser and the splitter.

If a surface, for example navigation surface 22, is illuminated by two coherent plane waves, for example illuminating beams 204, 206, the beams will interfere, and a series of alternating light and dark contour patterns will be formed where the surface intersects the projected fringes. If the illuminated surface is imaged onto detector array 28, for example a CMOS array imager or camera, a permanent record of the surface contour (i.e., surface height variation) is generated. A point on navigation surface 22 can, for example, be imaged onto detector array 28 by capturing diverging rays 207 and reconverging rays 208 onto a corresponding pixel of detector array 28 using imaging element 27. Each point of navigation surface 22 is thereby imaged to a unique point on detector array 28.

Figure 2B:
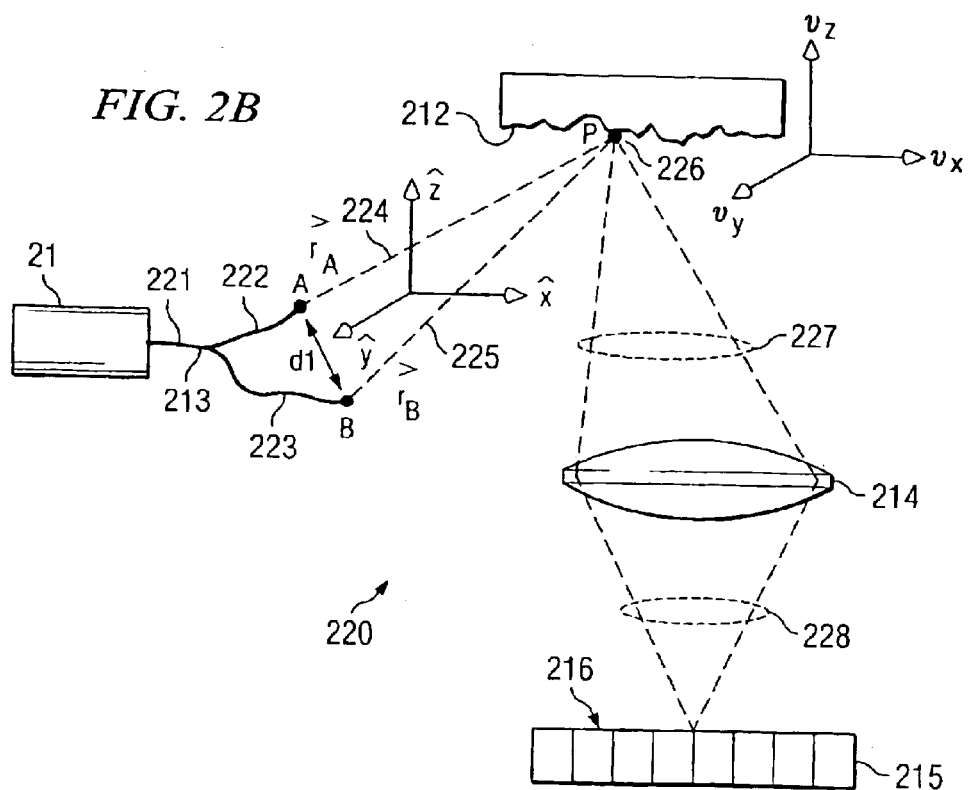
FIG. 2B is an optical diagram depicting an alternative system implementation for optical navigation using a projected fringe technique, in accordance with embodiments of the invention.

FIG. 2B is an optical diagram depicting alternate system implementation 220 for optical navigation using a projected fringe technique, in accordance with embodiments of the invention. Light from coherent light source 21, for example a VCSEL laser source, is emitted onto a guided optical path, for example optical fiber 221. At splitter 213, the light is split into multiple guided optical paths, for simplicity illustrated by dual optical fibers 222 and 223, which lead to respective coherent point light sources A and B spatially separated by distance d1. Light from each of dual coherent point light sources A and B travels a different unguided optical path of different optical path length to navigation surface 212. For example, light incident on point P 226 of navigation surface 212 from point light source A travels an unguided optical path 224 of optical path length $\vec{r}_A{}^>$, whereas light incident on point P 226 of navigation surface 212 from point light source B travels an unguided optical path 225 of optical path length $\vec{r}_B{}^>$.

Light directed at navigation surface 212 from closely spaced coherent point light sources A and B overlaps and generates an interference pattern, in accordance with the analysis provided in connection with FIG. 2A. The interference pattern is incident on navigation surface 212, where it is further modulated by surface topography of navigation surface 212, generating a unique optical representation of the surface height variations. In FIG. 2B, diverging light 227 from point P 226 on surface 212 is shown imaged by imaging element 214 by converging light 228 onto an element or pixel 216 of detector array 215. Similarly, overlapping light from combined coherent point light sources A and B illuminates a continuum of points on navigation surface 212. This continuum of points, defining the navigation surface, modulates the spatial intensity profile of the reflected light, which in turn is imaged onto corresponding pixels of detector array 215. Each point on navigation surface 212 is thereby imaged to a unique position on detector array 215. At detector array 215, signals are generated in response to interference of light arriving from the two paths. Two-dimensional relative motion, for example $v_x$, $v_z$ velocity components shown in the velocity axis detail of FIG. 2B, is determined from a traditional spatial correlation algorithm.

The technique described in connection with FIGS. 2A and 2B has application as an optical navigation technology, for example in an optical mouse. The source and detector are dimensionally stationary relative to one another in a computer mouse-like housing, which translates as a unit relative to navigation surface 22. If the navigation surface translates, the fringe pattern (intensity variation) seen at the detector array changes.

In FIG. 2A, fringe spacing d2 defines a three-dimensional spatial fringe pattern over the volume in which beams 204 and 206 overlap and interfere. Thus, this three-dimensional fringe pattern will project a two-dimensional fringe image pattern on any transverse or longitudinal surface that it intersects. Particularly, the interference pattern generated by the overlap of beams 204 and 206 will project a fringe image pattern onto navigation surface 22.

Figure 2C:
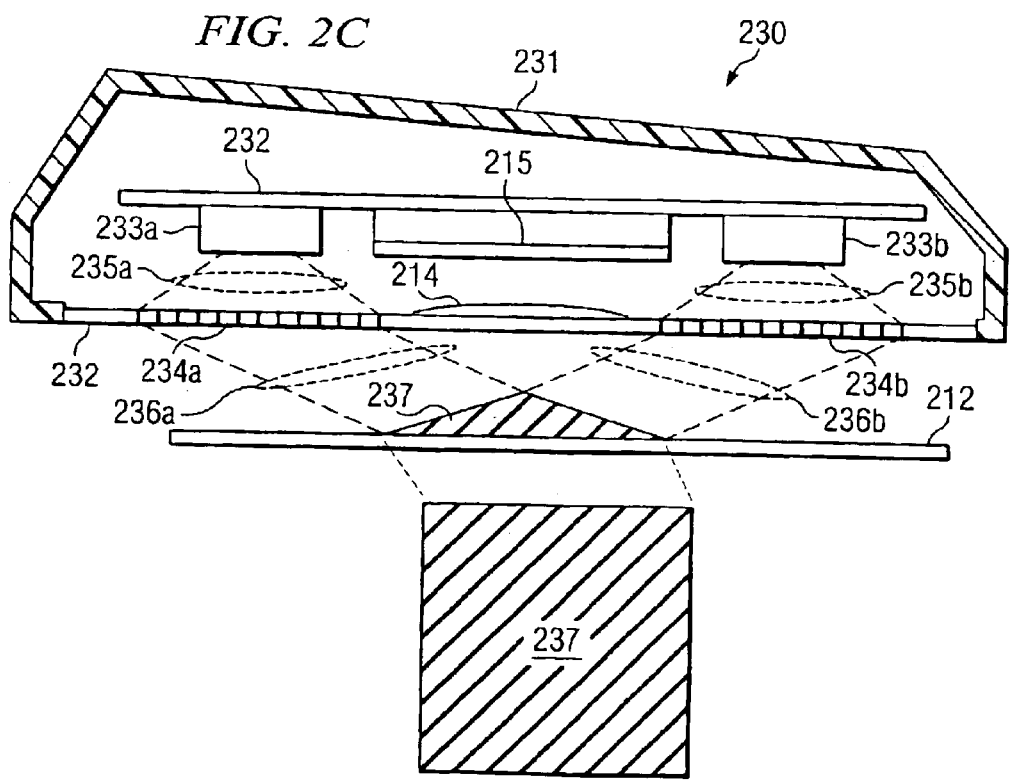
FIG. 2C is an optical diagram depicting yet another alternative system implementation for optical navigation using a projected fringe technique, in accordance with embodiments of the invention.

FIG. 2C is an optical diagram depicting yet another alternate system implementation 220 for optical navigation using a projected fringe technique, in accordance with embodiments of the invention. Optical navigation device 231 provides light sources 233a, 233b, detector array 215, and optical elements 214, 235a and 235b mounted to structural support member(s) 232. Intersecting coherent light beams 236a and 236b overlap and generate interference (or Moire) fringe pattern 237, which illuminates navigation terrain 212. Interference pattern 237 is further modulated by the topography of navigation terrain, and is imaged by imaging element 214 onto detector array 215. As in FIGS. 2A and 2B, relative movement between optical navigation device 231 and navigation terrain 212 is detected as changes in the imaged modulated interference pattern.

As depicted in FIG. 2C, overlapping coherent light beams 236a and 236b are each generated by a separate coherent light source 233a, 233b. The sources can be selected from, for example, diode emitters, laser diodes, lasers, and vertical-cavity surface-emitting lasers (VCSELs). If needed to stabilize the fringe pattern, coherence between two separate laser sources can be achieved and maintained by phase locking the sources relative to one another using any of a number of traditional techniques (see for example Snadden et al., *Optics Letters*, Vol. 22, No. 12, p. 892–894, Jun. 15, 1997, and references cited therein). Alternatively, overlapping coherent light beams 236a and 236b can be generated by splitting a coherent beam from a single light source, in a manner similar to that shown in FIGS. 2A and 2B. Wavelength tunable light sources may be used as desired in any of the embodiments of the invention. As depicted in FIG. 2C, each diverging beam 235a, 235b is then collimated and redirected by diffractive element 234a, 234b, to provide overlapping coherent light beams 236a, 236b. Alternatively, diverging beams 235a, 235b can be collimated and redirected using single or multiple non-diffractive optical elements.

By electronically processing the detected image signal of projected fringes on navigation surface 22 or 212 (performing correlation calculations on successive image frames), relative two-dimensional in-plane motion (displacement, velocity) of navigation surface is obtained. The processor output signal can then be used to control the location of a pointer on a computer screen.

By comparing successive stored frames, processor 105 (see FIG. 1) can determine relative motion, such that a correlation calculation of successive frames can be used to determine the distance and the directions of the relative in-plane movements. A captured frame overlaps partially with successive captured frames. Thus, navigation software algorithms can "look" at specific identifiable points on more than one frame and then calculate the distance and direction that each has moved. By storing successive frame pairs, overlap characteristics can be determined in processor 105 using traditional correlation algorithms, thereby yielding direction and magnitude of movement. This process is detailed in U.S. Pat. No. 5,786,804, and is widely used for optical pointing devices which rely on comparison of successive surface frames, where the surface frames have been generated according to traditional technology, for example, by shadows created by optical radiation reflecting from surfaces.

FIG. 3 is a flow diagram depicting operational sequence 300 for optically determining two-dimensional movement of a navigation surface relative to a navigation device, in accordance with embodiments of the invention. In operation 302 a coherent light beam, for example beam 202, is provided, which in operation 303 is split and redirected into two overlapping (intersecting) coherent beams, for example beams 204 and 206. Alternatively, in operation 302 and 303, each of the two overlapping coherent beams is generated from a separate coherent light source. In the latter case, phase locking of the two sources relative to one another can be used to maintain coherence if needed. The separately generated beams can then be collimated and redirected using single or multiple diffractive and/or non-diffractive optical elements. In operation 304 the two overlapping coherent beams generate an interference pattern, which in operation 305 is projected onto a navigation surface, for example navigation surface 22. In operation 306 the projected interference pattern is imaged onto a detector array, for example detector array 28, which provides signals that in operation 307 are processed. In operation 308 the processed signals are correlated in successive frame pairs to determine two-dimensional motion of navigation surface 22 and detector array 28. Two-dimensional position and/or velocity outputs are provided in operation 309.

The above description has dealt with determining in-plane motion of the detector relative to the navigation surface, using two-dimensional projected fringe patterns. This two-dimensional technique has high potential utility for use with an optical mouse.

FIG. 4 is a diagram depicting computer system 400, in accordance with embodiments of the invention. Optical mouse 410 moves relative to fixed navigation surface 420, and typically includes a coherent light source, similar to source module 103 in FIG. 1, and a detector, similar to detector array 104 in FIG. 1. Successive position images are processed and sent via wire or wirelessly to CPU 430 for display, usually controlling the position a small arrow or pointer on computer display screen 440. Typically, positional processing is performed internal to optical mouse 410, for example, by a processor similar to image processor 105 in FIG. 1. Alternatively, it is possible to send raw image data (or other intermediate data) from optical mouse 410 to CPU 430 via wire or wirelessly for processing. Optical mouse 410 is optionally hand-movable by an operator. CPU 430 typically is interconnected with a user input device, for example a keyboard.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

What is claimed is:

1. An optical navigation system for determining movement relative to a navigation terrain, said system comprising:
    an optical navigation device operable to generate two overlapping beams of coherent optical radiation, said two overlapping beams operable to generate a pattern of interference fringes, such that said two overlapping beams with said fringe pattern are operable to illuminate a surface portion of said navigation terrain;
    a detector array operable to generate an output pattern of signals in response to an input optical image pattern; and
    an imaging element disposed to image onto said detector array a portion of said navigation terrain surface illuminated with said two overlapping beams.

2. The system of claim 1 further comprising a primary optical source operable to generate a primary beam of coherent optical radiation; and
    a beam splitting element operable to split said primary beam of said coherent optical radiation into said two overlapping beams of coherent optical radiation, each of said overlapping beams having substantially the same degree of coherence as said primary beam.

3. The system of claim 2 wherein said primary source is selected from diode emitters, lasers, vertical-cavity surface-emitting lasers (VCSELs), laser diodes, and wavelength tunable light sources.

4. The system of claim 2 wherein said beam splitting element is an optical fiber beam splitter, and said two overlapping beams are diverging beams from two separate but proximate substantial point sources of coherent optical radiation.

5. The system of claim 4 wherein said two separate point sources are disposed to directly illuminate said navigation terrain surface portion.

6. The system of claim 2 wherein said beam splitting element is configured substantially as a Michelson interferometer, and wherein said overlapping beams propagate at an angle relative to one another.

7. The system of claim 6 wherein said Michelson configured interferometer is configured to cause said overlapping beams to illuminate said navigation terrain surface portion.

8. The system of claim 1 wherein said two overlapping beams with said fringe pattern are operable to cause illumination of said navigation terrain surface portion in a pattern of alternating light and dark fringe contours, wherein said contour pattern is a characteristic of modulation of said pattern of interference fringes by topography of said navigation terrain surface portion.

9. The system of claim 1 wherein said imaging element is selected from refractive focusing elements and reflective focusing elements.

10. The system of claim 1 further comprising a processor operable to process said pattern of signals from said detector array and to generate an output representing two-dimensional movement of said navigation terrain portion relative to said interference fringe pattern.

11. The system of claim 10 wherein said processor comprises an algorithm operable to correlate successive frames of signals from said detector array to generate said two-dimensional movement output.

12. The system of claim 1 further comprising two separate sources of coherent optical radiation, each said separate source operable to generate one of said two overlapping beams of coherent optical radiation.

13. The system of claim 12 wherein said two separate sources are operable to be phase locked relative to one another.

14. The system of claim 12 further comprising a diffractive optical element disposed to diffract one of said two overlapping beams of coherent optical radiation.

15. The system of claim 12 wherein said two separate sources are selected from diode emitters, lasers, vertical-cavity surface-emitting lasers (VCSELs), laser diodes, and wavelength tunable light sources.

16. A method for determining relative movement between an optical navigation device and a navigation terrain, said method comprising:
    generating two overlapping coherent optical beams;
    generating a pattern of interference fringes between said two overlapping optical beams;
    illuminating a surface portion of said navigation terrain with said pattern of interference fringes;
    imaging a portion of said fringe-illuminated surface; and
    generating a pattern of signals in response to said imaged fringe-illuminated surface portion.

17. The method of claim 16 wherein said generating two overlapping coherent optical beams comprises:
    generating a primary beam of coherent optical radiation from a single optical source; and
    dividing said primary beam into two overlapping coherent optical beams, each of said overlapping optical beams having substantially the same degree of coherence as said primary beam.

18. The method of claim 17 wherein said primary beam is generated by an optical source selected from diode emitters, lasers, vertical-cavity surface-emitting lasers (VCSELs), laser diodes, and wavelength tunable optical sources.

19. The method of claim 17 wherein said dividing is performed using an optical fiber beam splitter, such that said two overlapping beams diverge from two separate but proximate substantial point sources of coherent optical radiation.

20. The method of claim 17 wherein said dividing is performed using substantially a Michelson interferometer, and wherein said overlapping beams propagate at an angle relative to one another.

21. The method of claim 16 additionally comprising processing said pattern of signals to generate an output signal representing two-dimensional movement of said navigation terrain portion relative to said interference fringe pattern.

22. The method of claim 21 further comprising correlating successive frames of said output signals to generate said two-dimensional movement output.

23. The method of claim 21 wherein said output signal controls a positional pointer on the display of a computer.

24. The method of claim 16 wherein said generating two overlapping coherent optical beams comprises generating each of said overlapping coherent optical beams from a separate optical source.

25. The method of claim 24 wherein said separate optical sources are phase locked relative to one another.

26. The method of claim 24 wherein said separate optical sources are selected from diode emitters, lasers, vertical-cavity surface-emitting lasers (VCSELs), laser diodes, and wavelength tunable optical sources.

27. A computer input pointer, said pointer comprising:
  means for emitting at least two beams of coherent light incident upon a surface at a non-zero angle to each other;
  means for generating an image of an interference pattern on said surface created by said at least two beams;
  means for relating said image to a topography of said surface; and
  means for determining movement of said pointer relative to said surface by comparing successive images from said image generating means.

28. The pointer of claim 27 wherein said emitting means is a Michelson interferometer.

29. The pointer of claim 27 wherein said image generating means is an array of photo-detectors.

30. The pointer of claim 27 wherein said determining means uses a Moire metrology to detect changes in said topography of said surface.

31. The system of claim 1 wherein each said beam is generated by its own light source.

* * * * *